July 9, 1940.  M. F. MAURER  2,207,327
WATER SOFTENING PLANT
Filed March 27, 1939   2 Sheets-Sheet 1

Inventor
Marion F. Maurer

By Clarence A. O'Brien
and Hyman Berman
Attorneys

July 9, 1940.　　　　M. F. MAURER　　　　2,207,327
WATER SOFTENING PLANT
Filed March 27, 1939　　　2 Sheets-Sheet 2
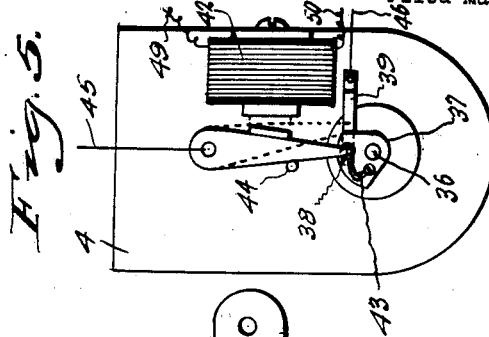
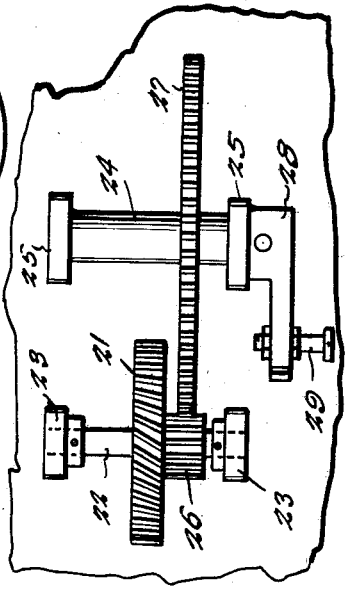
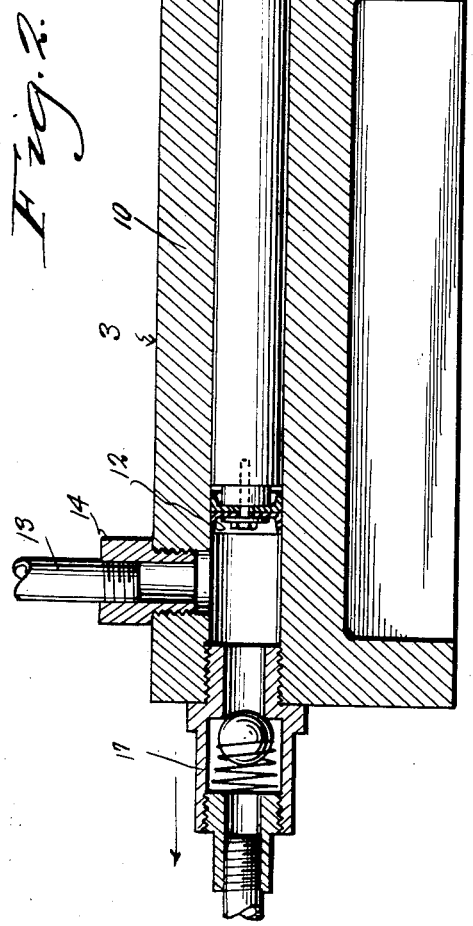
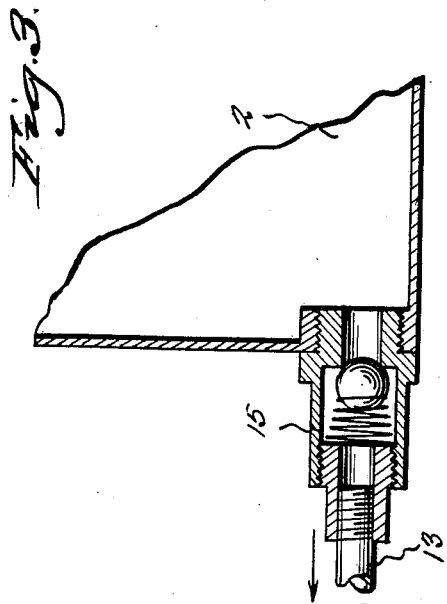
Inventor
Marion F. Maurer
By Clarence A. O'Brien
and Hyman Berman
Attorneys Patented July 9, 1940

2,207,327

UNITED STATES PATENT OFFICE 2,207,327

WATER SOFTENING PLANT

Marion F. Maurer, Springfield, Ohio

Application March 27, 1939, Serial No. 264,448

3 Claims. (Cl. 210—40)

My invention relates to water treating plants and more particularly plants for softening water.

The invention is designed with the particular purpose in view of providing an efficient, inexpensive plant for softening water for domestic purposes and which may be installed in a small space in practically any location as a household appliance for operation by the usual house current.

Another object is to provide a plant of the character and for the purposes above set forth adapted to inject a measured quantity of softening chemical into a measured quantity of water so that water consumed over long periods is always softened uniformly.

To the accomplishment of the foregoing, and subordinate objects presently appearing, a preferred embodiment of my invention has been illustrated in the accompanying drawings, set forth in detail in the succeeding description, and defined in the claims appended hereto.

In said drawings:

Figure 2 is a fragmentary view in longitudinal section of the pump and parts pertinent thereto, and drawn to an enlarged scale.

Figure 3 is a fragmentary view in vertical section taken on the line 3—3 of Figure 1 and showing the check, or back pressure valve, in the supply line between the chemical storage tank and the pump.

Figure 4 is a fragmentary view in top plan of the drive between the motor and the pump, and Figure 5 is a view in side elevation of the meter and the control mechanism operated thereby.

Figure 1:
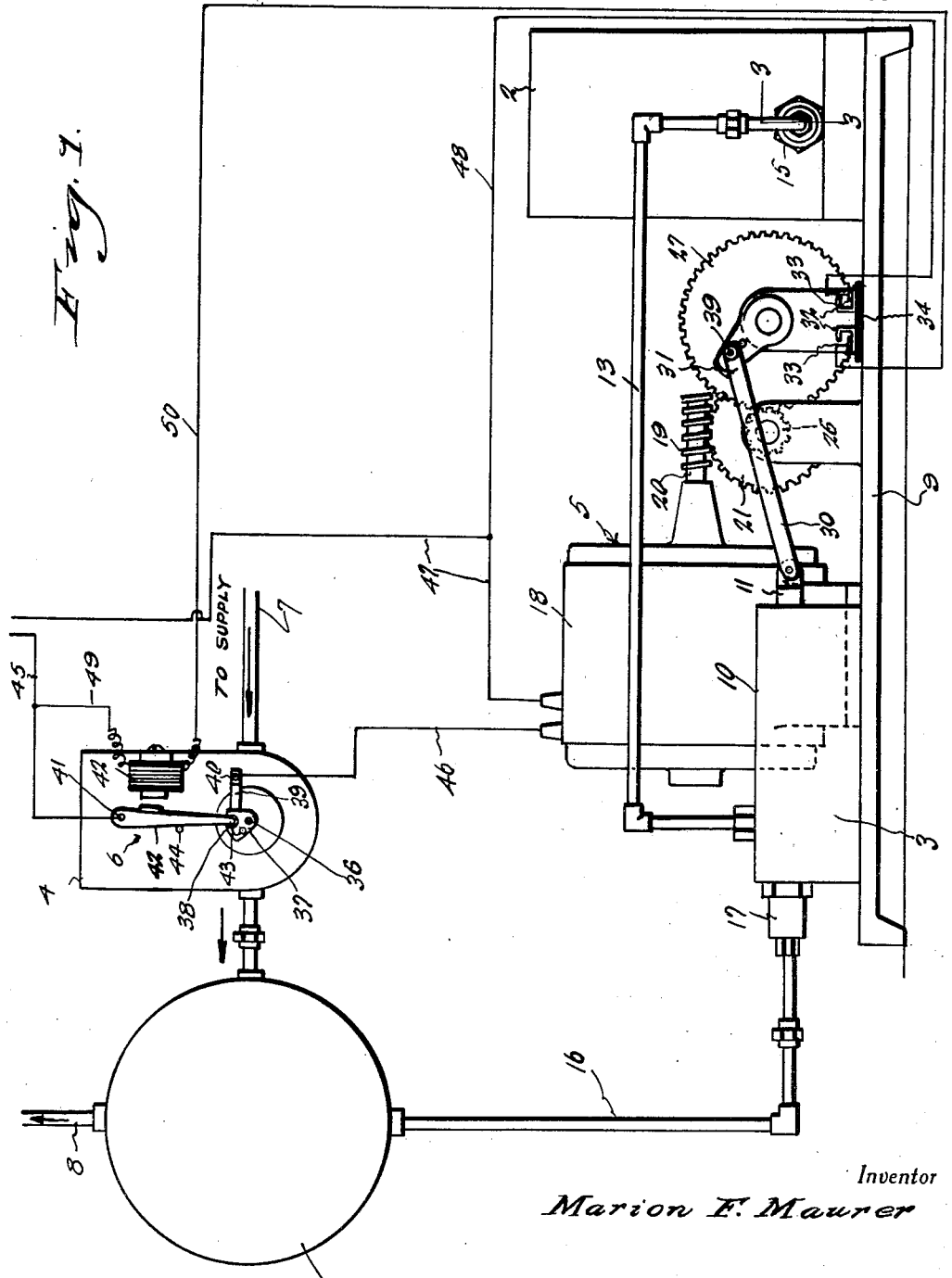
Figure 1 is a view in side elevation of a plant constructed in accordance with my invention.

Referring to the drawings by numerals, the basic elements of my improved plant are a water storage tank 1, a chemical storage tank 2, a pump 3, a meter 4, a motor drive 5 for the pump, and an electrical control 6 operative in part by the meter 4 to close circuit to the motor 5 and also operative by the motor drive 5 to break said circuit and thereby stop said drive.

The water storage tank 1 is designed to be mounted, by any suitable means, in suspended position and has attached to one side thereof a water supply line 7 leading from the household water main, not shown, and a similar line at the top thereof for the discharge of water from said tank by way of a spigot or other similar appliance, not shown.

The chemical storage tank 2, the pump 3, and the motor drive 5 are supported by a suitable flat base 9, said tank 2 being preferably secured to one end of the base and the pump 3 at the other at any desired level below that of the tank 1.

The pump 3 comprises a horizontally disposed cylinder 10 having extending from one end thereof a piston rod 11 equipped with a piston 12. The opposite end of the cylinder 10 comprises both the intake and discharge end of the pump and is connected, at the top of said cylinder, to the bottom of the chemical storage tank 2 by a chemical supply line 13, said line being connected to the cylinder 10 by way of a coupling 14 and to the chemical storage tank 2 through the medium of a check valve 15 of any suitable type adapted to prevent back flow of chemical from the line 13 into said tank. The intake and discharge end of the cylinder 10 is similarly connected to the bottom of the water storage tank 1 by a chemical supply line 16 having a check valve 17 interposed therein for preventing backflow through said line into the cylinder 10.

The motor drive 5 comprises a suitable motor 18 fixed in any desired manner to the base 9 and provided with a worm 19 on the armature shaft 20 thereof meshing with a worm gear 21 fast on a shaft 22 journaled at its opposite ends in bearing brackets 23 upstanding from said base 9. The shaft 22 is operatively connected to a crank shaft 24 journaled at its opposite ends in bearing brackets 25 similar to brackets 23, the connection being in the form of reduction gearing including a small gear 26 fast on shaft 22 and a large gear 27 fast on shaft 24. The shaft 24 has fast on one end thereof a crank 28 operatively connected by a wrist pin 29 and link 30 to the extended end of the piston rod 11. The crank 28 has suitably secured to the outer end thereof a contact shoe 31 of material serving as a conductor of electricity which is insulated in any desired manner from the crank 28. The shoe 31 is designed to wipe over and bridge a pair of spaced contacts 32 secured to the base 9 each by a binding post 33 and with a block of suitable insulation 34 between the same and said base.

As will presently more clearly appear the described motor drive 5 is designed for intermittent single cycle operation to impart similar single cycles of operation to the piston rod 11 and piston 12 during which a charge of chemical from the chemical storage tank 2 is drawn therefrom by way of the chemical supply line 13 into the cylinder 10 and a preceding charge in the cylinder 10 expelled therefrom and injected into the water in the water storage tank 1 by way of the line 16. At the end of each cycle of operation of the motor drive 5 the crank 28 assumes a position in which it depends from the shaft 24 to locate the shoe 31 in bridging relation to the contacts 32 for a purpose presently seen.

The meter 4 is interposed in the water supply line 7 and is of a type in which an exteriorly extending shaft 36 thereof performs a complete revolution each time a quantity of water has passed through the meter to the water storage tank 1.

Coming now to the meter operated control, fast on the shaft 36 of the meter 4 is a segmental plate 37 of insulating material adapted to be revolved by said shaft and having extending through the same adjacent to the outer edge thereof a contact button 38 designed in the full cycle position of said shaft 36, and hence the plate 37, to wipingly engage a contact finger 39 fixed at one end, as at 40, to the meter 4 to extend between said segmental plate 37 and said meter. Pivoted, as at 41, to the meter 4 is a finger-like armature 42 depending from its pivot 41 with its lower end disposed alongside the plate 37 on the side thereof opposite the finger 39 for engagement, in the full cycle position of the segmental plate 37, by the button 38 and swingable on its pivot in opposite directions into and from such engagement, respectively. Mounted in any suitable manner on the meter 4 is an electro-magnet 42' adapted, when energized, to attract the armature 42 and swing the same from the described position of engagement with the button 38. A resilient wire-like finger 43 is suitably secured to the segment 37 to wipingly engage the lower end of the armature 42 and move the latter into engaging position relative to the button 38 as an incident to rotation of said segmental plate 37 into full cycle position. A stop pin 44 on the meter 4 establishes the engaging position of the armature 42.

Referring now to the wiring, one side of the motor 18 is adapted to be connected to the source of electrical supply, for instance, the house current, by way of a lead 45 from said source, not shown, to the armature 42 and a lead 46 from the finger 39 to said side of the motor. The other side of the motor 18 is connected to said source by way of a lead 47 having a branch 48 to the binding post 33 of one of the contacts 32. The lead 45 is connected to one side of the field of the electro-magnet 42' by way of a lead 49. The other side of said field is connected to the binding post 33 of the other contact 32 by way of a lead 50.

Referring now to the operation, in the normal full cycle position of the motor drive 5, previously described, the crank 28 is in full cycle position wherein the shoe 31 bridges the contacts 32 and the piston rod 11 is retracted having under previous operation drawn a charge of chemical from the chemical storage tank 2 into the cylinder 10 also as previously described. In the bridging position of the shoe 31 circuit is completed through the field of the electro-magnet 42' by way of lead 45, branch 49, lead 50, contacts 32, branch 48 and lead 47. Thus the electro-magnet 42' is energized to attract the armature 42 from the described engaging position and the circuit to the motor 18 is broken. Under the action of the meter 4 as an incident to each measured quantity of water passing therethrough the segmental plate 37 is revolved, counter-clockwise as viewed in Figure 1, into full cycle position, shown in Figure 1, to wipingly engage the contact button 38 with the finger 39.

Coincidentally with movement of the segmental plate 37 into full cycle position the lower end of the armature 42 is frictionally gripped by the finger 43 and swung on its pivot 41 into engaging position against the stop 44 to be wipingly engaged in said position by the button 38 as the segmental plate 37 reaches full cycle position. In this position of the parts the armature 42 is held by the member 43 in opposition to attraction by the electro-magnet 42' and circuit is completed to the motor 18 by way of lead 45, armature 42, button 38, finger 39, lead 46, and lead 47. Thus the motor 18 is energized whereby through the described operating connection, to wit, the worm 19, worm wheel 21, gearing 26, 27, crank 28 and the link 30, piston rod 11 and piston 12 are operated through a cycle of movement to eject the charge of chemical contained in the cylinder 10 into the water storage tank 1 in a manner which will be clear. As soon as the motor drive 5 has performed a complete cycle of operation during the latter half of which another charge of chemical is drawn into the cylinder 10, the crank 28 assumes full cycle position, bridges the contacts 32 and thereby energizes the electro-magnet 42 in the manner already described to attract the armature 42 into disengaging position and thereby interrupt the circuit to the motor and stop the same. During this cycle of operation of the machine, the member 43 has released the lower end of the armature 42 to free the same for attraction by said electro-magnet.

As will now be seen, uniform quantities of chemical, measured by the stroke of the piston 12 and the capacity of the cylinder 10 are injected into uniform quantities of water measured under each cycle of operation of the meter 4 so that the water in the water storage tank, 1, is uniformly softened.

Preferably as a softening chemical sodium hydroxide is used instead of the expensive compound commonly resorted to.

The foregoing will, it is believed, suffice to impart a clear understanding of my invention without further explanation.

Manifestly, the invention, as described, is susceptible of modification without departing from the inventive concept and right is herein reserved to such modifications as fall within the scope of the subjoined claims.

What I claim is:

1. In apparatus of the class described, a storage tank for water, a storage tank for a water softening agent, a line of connection between said tanks, a pump in said line of connection for transferring a measured quantity of said agent from the second mentioned tank to the water storage tank under each cycle of operation thereof, means to supply water under pressure to said water storage tank in measured quantities including a meter operative into and from full cycle position, an electric motor drive for said pump operative into and from full cycle position, an electric circuit for said motor, means operative by said meter in the full cycle position thereof to close said circuit and thereby cause operation of said pump during measuring by said meter, and means operative under control of said drive in the full cycle position to open said circuit and thereby arrest operation of said pump.

2. In apparatus of the class described, a storage tank for water, a storage tank for a water softening agent, a line of connection between said tanks, a pump in said line of connection for transferring a measured quantity of said agent from the second mentioned tank to the water storage tank under each cycle of operation thereof, means to supply water under pressure to said water storage tank in measured quantities including a meter operative into and from full cycle position, a motor drive for said pump operative into and from full cycle position, an electric circuit for said motor, means operative by said meter in the full cycle position thereof to close said circuit and thereby cause operation of said pump during measuring by said meter, and means operative under control of said drive in the full cycle position to open said circuit and thereby arrest operation of said pump, said meter operative means comprising a switch opened by said drive controlled means.

3. In apparatus of the class described, a storage tank for water, a storage tank for a water softening agent, a line of connection between said tanks, a pump in said line of connection for transferring a measured quantity of said agent from the second mentioned tank to the water storage tank under each cycle of operation thereof, means to supply water under pressure to said water storage tank in measured quantities including a meter operative into and from full cycle position, an electric motor drive for said pump operative into and from full cycle position, an electric circuit for said motor, means operative by said meter in the full cycle position thereof to close said circuit and thereby cause operation of said pump during measuring by said meter, and means operative under control of said drive in the full cycle position to open said circuit and thereby arrest operation of said pump, said meter operative means comprising a switch including an armature movable to open the switch, and said drive controlled means including an electro-magnet for moving said armature.

MARION F. MAURER.